(12) United States Patent
Spurlock et al.

(10) Patent No.: US 8,533,957 B2
(45) Date of Patent: Sep. 17, 2013

(54) METHOD OF MANUFACTURING A ROLLER BEARING SEAL

(75) Inventors: Bryan J. Spurlock, Petersburg, VA (US); Dwight A. Marcellus, Petersburg, VA (US)

(73) Assignee: Amsted Rail Company, Inc., Chicago, IL (US)

( * ) Notice: Subject to any disclaimer, the term of this patent is extended or adjusted under 35 U.S.C. 154(b) by 219 days.

(21) Appl. No.: 13/134,646

(22) Filed: Jun. 14, 2011

(65) Prior Publication Data

US 2012/0317814 A1   Dec. 20, 2012

(51) Int. Cl.
*B21D 53/10* (2006.01)

(52) U.S. Cl.
USPC ............. 29/898.11; 29/898; 29/564; 29/33 B; 29/33 D; 29/33 T; 29/724; 29/725; 228/146; 228/173.3

(58) Field of Classification Search
USPC .................. 29/898, 898.11, 564, 33 B, 33 D, 29/33 T, 724, 725, DIG. 32, 897–897.381; 228/146, 173.3
See application file for complete search history.

(56) References Cited

U.S. PATENT DOCUMENTS 5,348,213 A * 9/1994 Randlett et al. ............... 228/146
5,594,988 A * 1/1997 Fishman ................... 29/894.353

* cited by examiner

*Primary Examiner* — Richard Chang
(74) *Attorney, Agent, or Firm* — Edward J. Brosius

(57) ABSTRACT

A method of manufacturing bearing seal for use in a roller bearing is provided. A steel coil of a preselected width is fed into a ring rolling machine to form a closed coil ring. The closed coil ring is then welded along the butted joint. The welded closed coil ring is then fed to a series of pre-forming machines wherein the desired profiles of the final bearing seal are formed.

11 Claims, 4 Drawing Sheets

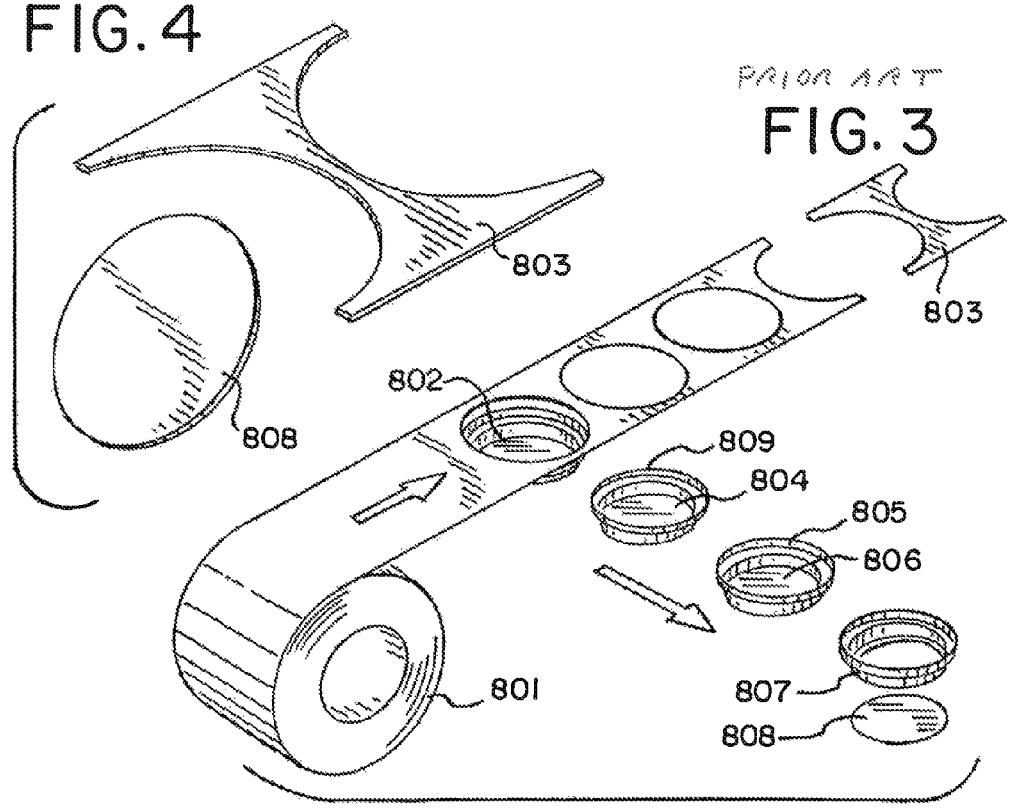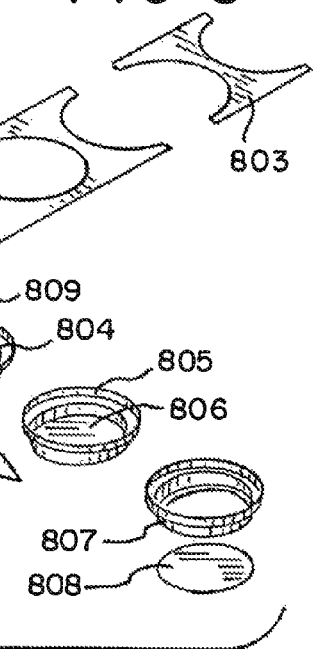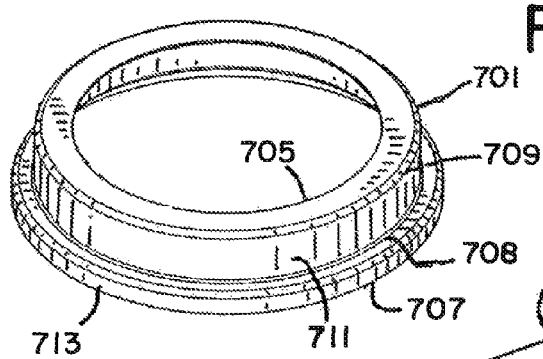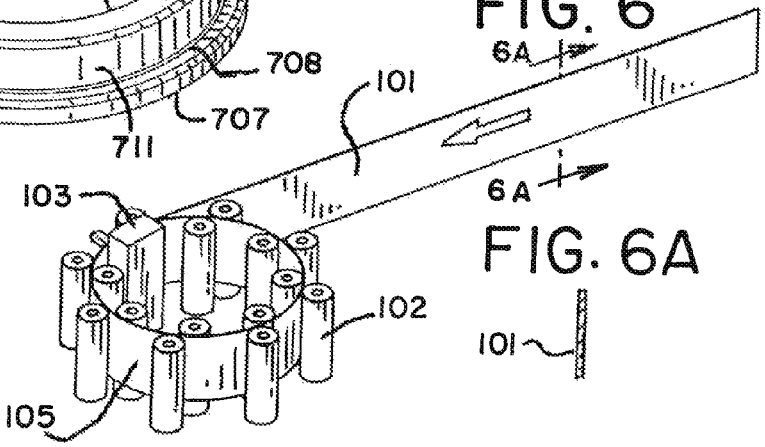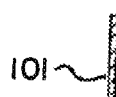

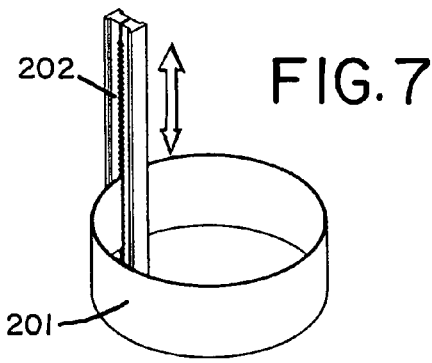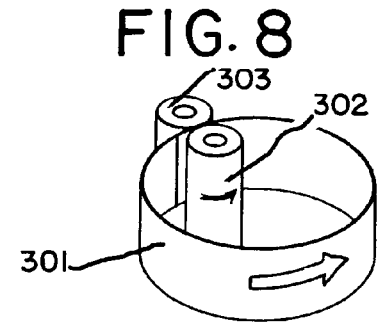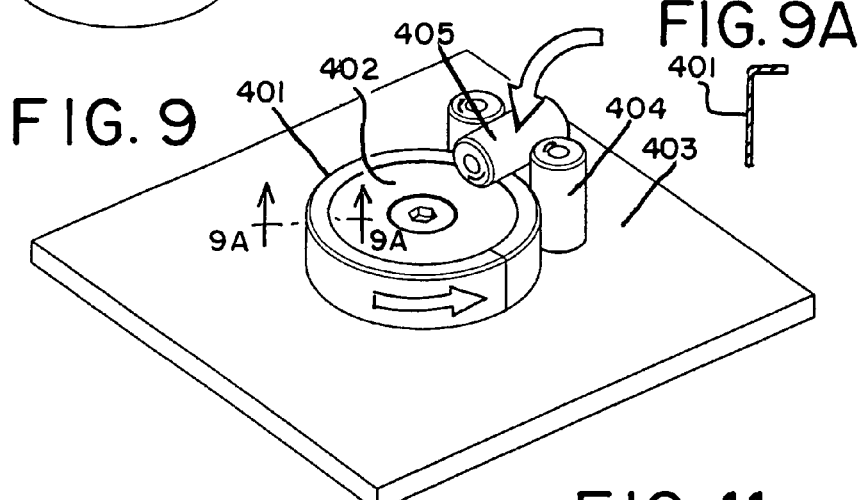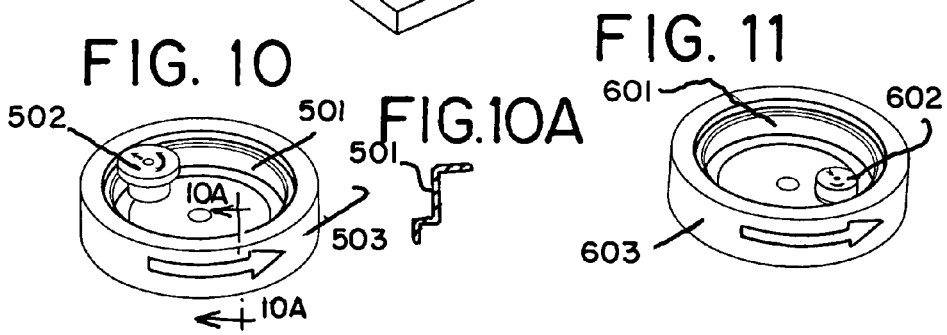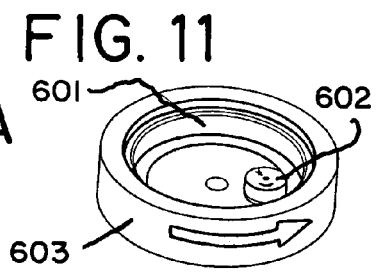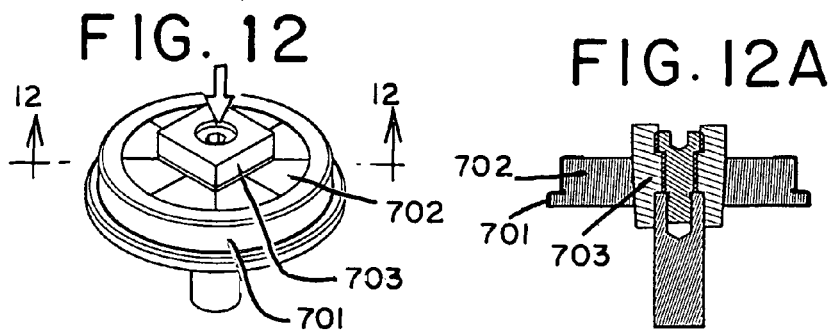

METHOD OF MANUFACTURING A ROLLER BEARING SEAL

FIELD OF THE INVENTION

This invention relates to roller bearings, and more particularly, to a method of manufacturing a seal component for a tapered roller bearing fitted on a railway freight car axle.

BACKGROUND OF THE INVENTION

Tapered roller bearings on railcar axles support operating loads capable of producing deflections in the axle, and in particular, the end portion of the axle comprising the journal on which the tapered roller bearing is affixed. The stresses imposed by the operating loads are particularly high in the journal portion of the shaft at or near the backing ring.

As result of shaft deflections, the backing ring and the journal often experience fretting wear as the backing ring moves relative to the journal. Fretting wear may be sufficient to loosen the backing ring, increasing the axial play of the bearing on the journal. The loose backing ring accelerates wear on the bearing assembly and journal, potentially leading to shaft or bearing failure.

It is desirable to retain lubricants in the form of oils or grease within the bearing while also excluding water and abrasives. Such lubricants are held within the bearing by means of a bearing seal, that is a generally ring shaped structure that usually includes a resilient seal member.

It is an object of the present invention to provide an improved method for the manufacture of a bearing seal.

SUMMARY OF THE INVENTION

The present invention provides an improved method of manufacturing a bearing seal component for a tapered roller bearing designed to be fitted on railway freight car axle. The method of the present invention is a significant improvement over the currently known methods which usually involve a stamping operation having several steps requiring dedicated stamping equipment and result in a significant amount of scrap. The method of the present invention involves the use of a sheet of steel, which is the usual material of which a bearing seal is comprised, of the exact width in material needs of the finished bearing seal, such sheet of steel cut and run is initially through a ring forming machine. The formed ring is then welded, and run through the necessary number of pre-forming operations to result in a final formed bearing seal. The method of the present invention is seen to be an improvement from a material use and efficiency point of view.

BRIEF DESCRIPTION OF THE FIGURES

In the drawings,

FIG. 3 is a perspective view of a prior art method of manufacture of a bearing seal;

FIG. 4 is a perspective view of the waste steel from the prior art method of manufacturing a bearing seal;

FIG. 5 is a perspective view of a finished bearing seal in accordance with an embodiment of the present invention;

FIG. 6 is a perspective view of a steel coil being fed into a ring forming machine in accordance with an embodiment of the present invention;

FIG. 7 is a perspective view of the removal of a weld bead in accordance with an embodiment of the present invention;

FIG. 8 is a perspective view of the weld bead being in a flattening operation in accordance with an embodiment of the present invention;

FIG. 9 is a perspective view of the first pre-forming operation in accordance with an embodiment of the present invention;

FIG. 10 is a perspective view of a second pre-forming operation in accordance with an embodiment of the present invention;

FIG. 11 is a perspective view of a third pre-forming operation in accordance with an embodiment of the present invention, and FIG. 12 is a perspective view of a final forming operation in accordance with an embodiment of the present invention.

DETAILED DESCRIPTION

Figure 1:
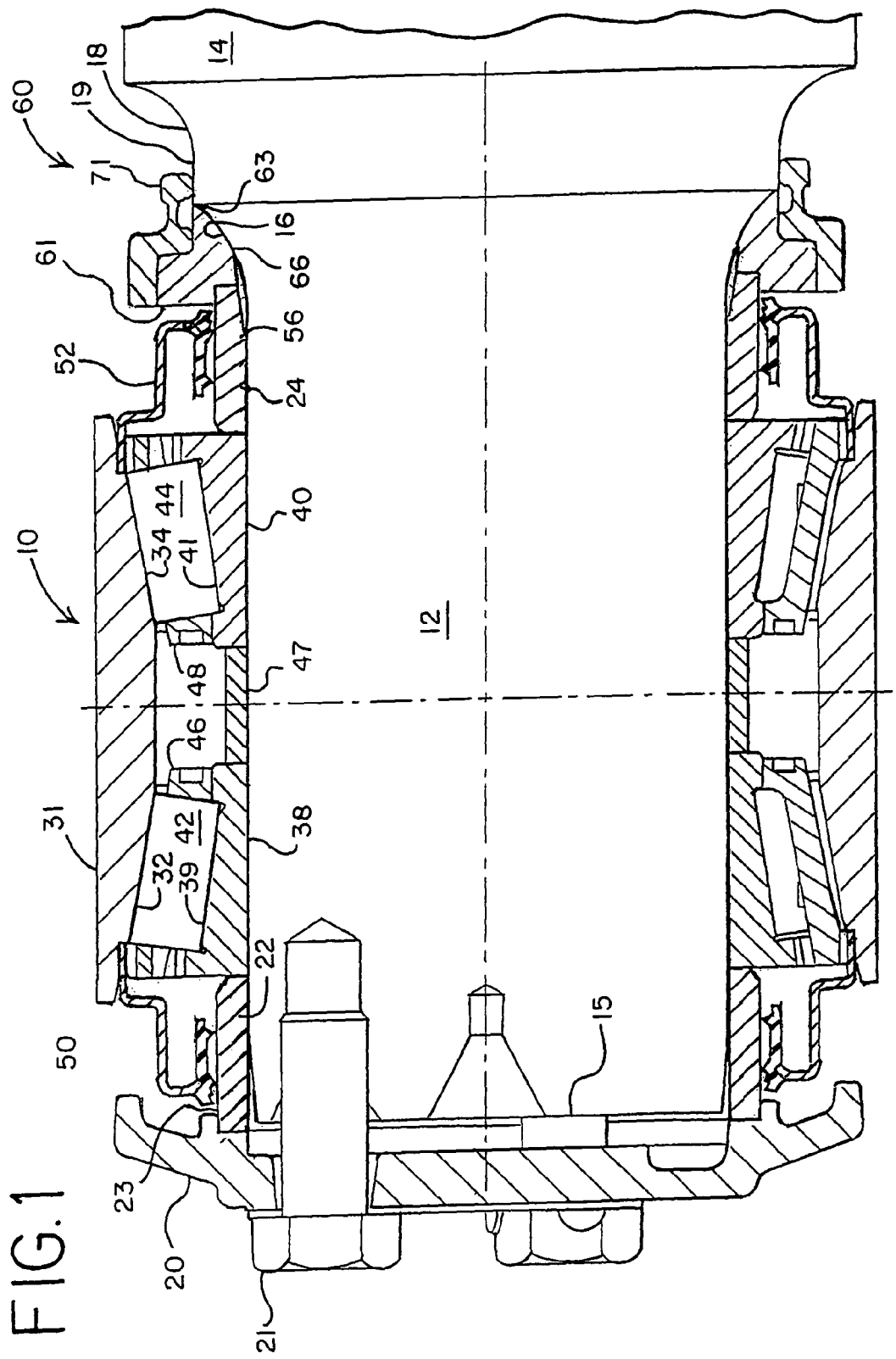
FIG. 1 is a sectional view of a first embodiment of the backing ring assembly in accordance with an embodiment of the present invention.

Referring to FIG. 1, an embodiment of the backing ring assembly in accordance with the present invention is illustrated. In this embodiment, the bearing assembly 10 is a tapered roller bearing of the type commonly used in railway applications to support a railcar wheel on an axle.

The bearing assembly 10 is typically preassembled before being mounted on railcar axle 14. At each free end of the axle 14, a journal 12 terminates in a slightly conical tapered section 15 to facilitate installation of the bearing assembly 10 onto the journal. The bearing assembly 10 is pressed onto the journal 12 of the axle 14 to establish an interference fit.

A dust guard 18 with a larger diameter than the journal 12 is located axially inward from the journal 12. Axially inward from the dust guard 18, the shaft 14 extends to its largest diameter. The weight of the railcar is transferred through the bearing assembly 10 to the shaft and further transferred to the rails through the railcar wheels (not shown) fitted inboard of the dust guard on the shaft.

Some bearing assemblies 10 have wear rings 22, 24 fitted over the journal 12 and which about each end of the bearing assembly 10. The wear rings 22, 24 typically have an inner diameter dimension to provide an interference fit with the journal 12 over at least a portion of their length. The wear rings 22, 24 rotate with the shaft as it turns.

Although the bearing assembly 10 is pressed onto the journal 12, further restraint is generally required against axial loads. To provide this axial restraint, the bearing assembly 10 is captured between a backing ring assembly 60 at the inboard side and a bearing retaining cap 20 at the outboard side of the bearing assembly 10.

Figure 2:
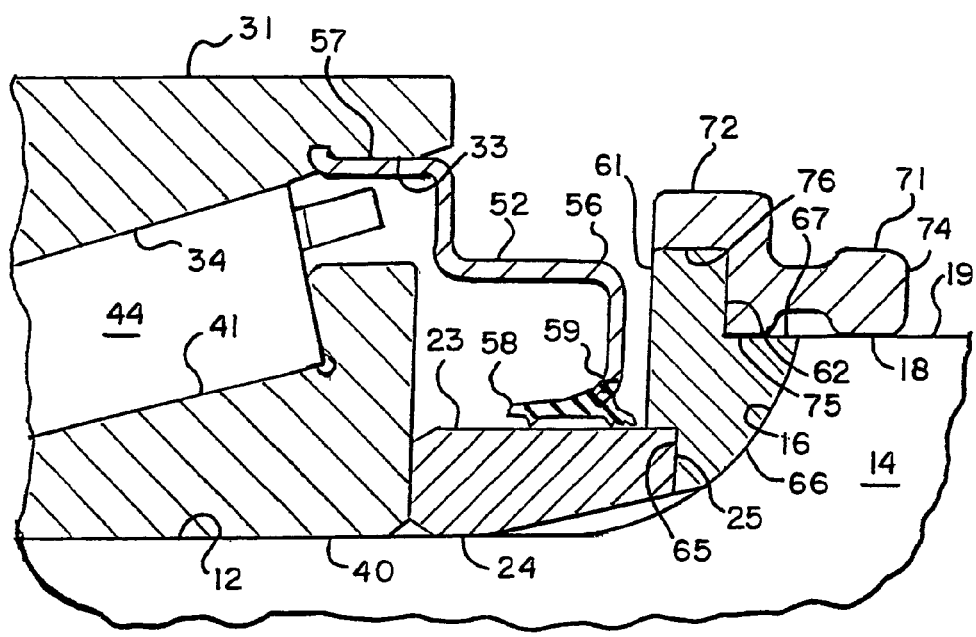
FIG. 2 is an enlarged sectional view of the first embodiment of the backing ring assembly in accordance with an embodiment of the present invention.

Referring now to FIG. 2 as well, at the inboard side of the journal 12 portion of axle 14, the bearing assembly 10 is captured by the backing ring 61 through abutting wear ring 24. Backing ring 61 has an inner contoured surface 66 allowing a tight surface fit with a complementary surface on the fillet 16 on the inboard end of the journal 12. The fillet 16 leads to a shoulder 17, the shoulder extending to form a dust guard 18 having a cylindrical surface 19. Backing ring 61 has an inboard distal edge 63 at the contoured surface 66, generally abutting fillet 16.

Locking ring 71, has a lateral inner end adjacent to the dust guard 18. Locking ring lateral outer end engages backing ring 61 and restrains backing ring 61, against deflection and axial displacement. Backing ring 61 and locking ring 71 together form the backing ring assembly 60. Locking ring 71, the furthest inboard component affixed to the journal 12, affixes the bearing assembly 10 against axially inward displacement.

At the outboard end of the journal, the bearing assembly 10 is captured by the bearing retaining cap 20 through the interposed and abutting outboard wear ring 22. Bearing retaining cap 20 is affixed to the free end of journal 12 with cap screws or bolts 21 threaded into a plurality of threaded bores. Bearing retaining cap 20 completes the mounting of the bearing assembly 10 onto the journal 12, providing a clamping force to restrain the bearing assembly against axially outward displacement.

The bearing assembly 10 is preassembled from a number of individual components, including two cylindrical bearing cones 38, 40 and a cylindrical bearing cup 31. Bearing cup 31 has an inner surface having radially inward directed outer raceways 32, 34. The bearing cones 38, 40 have radially outward directed inner raceways 39, 41. A center spacer 47 is positioned between the bearing cones 38, 40 to maintain the cones in accurately spaced position relative to each other and allow for proper bearing lateral clearance. The outer raceways 32, 34 in the bearing cup 31 cooperate with the inner raceways 39, 41 in the bearing cones 38, 40 to capture and support two rows of the tapered rollers 42, 44. In some embodiments, cages 46, 48 maintain the circumferential spatial positioning of the rollers 42, 44.

Bearing seals 50, 52 cover the ends of the bearing assembly 10 to minimize both lubricant leakage from the bearing and intrusion of contaminants such as water or abrasives into the bearing. In a first embodiment, the bearing seals 50, 52 are affixed to the stationary (i.e., non-rotating) side of the bearing assembly 10 (such as the bearing cup 31) by interference fit or other appropriate method.

A seal body 56, typically of a generally ring shaped steel construction, is part of bearing seal 50, 52 to form a dynamic seal between stationary and moving bearing assembly components. In one embodiment, the seal body 56 is urged against the wear ring 22, 24 to seal the bearing assembly 10. A first radial edge 57 of seal body 56 is received against an inner radial surface 33 of bearing cup 31. A second radial edge 59 of seal body 56 extends radially inward and has a resilient seal 58 attached thereto. Resilient seal 58 contacts outer radial surface 23 of wear ring 24 and is typically comprised of a rubber or synthetic flexible material.

Cylindrical wear rings 22, 24 protect the journal 12 against rubbing wear from the seal body by providing a wear surface 23.

Referring to FIG. 2, the backing ring assembly 60 of FIG. 1 is illustrated in an enlarged sectional view. Backing ring 61 has an inner contoured surface 66 adjacent the journal 12 at the complementary surface of the fillet 16.

A slot or cutout section 65 in the axially inward directed surface of backing ring 61 receives the laterally inner end 25 of wear ring 24 in an interference fit.

Locking ring 71 further has a lateral outer end 72 of a larger diameter and having a cutout section 76 for receiving a radially outward extending portion 62 of backing ring 61. Locking ring 71 outer end 72 includes an inner radial surface 75 that is adjacent outer radial surface 67 of backing ring 61. Locking ring 71 inner end 74 includes an inner radial surface 78 that is adjacent outer radial surface 19 of axle 14.

Locking ring 71, with its connection between backing ring 61 and the cylindrical surface 19 of the dust guard 18, reinforces and anchors backing ring 61 against axial displacement and deflection. It is believed that the flexibility of the locking ring 71 allows backing ring 61 to more readily move with the deflection of the journal 12, yet, still allow locking ring 71 to restrain the axial displacement of backing ring 61.

Referring now to FIG. 3 and FIG. 4, the currently known method for forming a bearing seal or bearing seal case is to stamp the bearing seal case from a flat rolled coil of steel 801. It is noted that the width of the flat rolled coil of steel 801 is wider than the diameter of the material needed to form the final bearing seal case 807. The seal case itself is an important component of the entire bearing assembly in that the seal case is utilized to both retain lubricant within the moving components of the bearing assembly and to keep undesired components such as rainwater and dirt out of the moving components of the bearing assembly.

The process currently utilized to manufacture bearing seal case 807 is known as a drawing process, wherein the bearing seal is formed in a progressive die stamping operation. These progressive operations are generally shown in FIG. 3, with a first stamping operation forming a pre-form bearing seal 802, a second stamping operation forming a second pre-form bearing component 809, and a final stamping operation forming a final bearing seal 805. It is seen that a waste portion of steel 808 ultimately is released during the final forming operation, with initial centrally located steel components from the initial stamping shown as 802, central component 804 in the second pre-forming operation, and central component 806 formed in the third stamping operation. The ultimate amount of waste product from the known bearing stamping operation is shown in FIG. 4 as center component 808 and leftover portion 803 of coil 801. It is an important object of the present invention to provide a more efficient method of manufacturing a bearing seal component. In the second forming operation wherein bearing component 804 is restruck, the seal case 809 is given an initial start of its final geometry. The next operation is a piercing operation wherein bearing seal 805 is coined to its final form. Bottom portion 806 is cut and pressed back into the seal case to be carried to the final forming operation. In the final operation, the pierced bottom section or waste section 808 is removed from bearing seal 807.

Referring now to FIG. 5, a finished bearing seal case in accordance with an embodiment of the present invention is shown generally at 701. Bearing seal case 701 is seen to comprise an inner diameter 705 which is typically the inner diameter of a strengthening lip that begins at pre-form or bent section 709. Inner diameter section 705 is seen to be at about a 90° angle to main bearing seal case section 711. Outer diameter 707 is formed as a lip with an initial transfer step 708 extending from main section 711 and ending with a transverse section 713 to form outer diameter 707.

Referring now to FIG. 6-FIG. 12, the method of forming bearing seal case 701 in accordance with an embodiment of the present invention is set forth. Steel coil 101 is fed into a ring rolling machine 102 which is comprised of sets of rollers. Steel coil 101 is formed into a closed coil ring 105, which is cut from steel coil 101. Closed coil ring 105 is welded with weld fixture 103 in place.

Referring now to FIG. 7, closed coil ring 201 is shown as being transferred to weld bead removal station 202.

The weld bead formed on welded steel coil ring 301 is flattened in the operation shown in FIG. 8 by passing welded steel coil ring 301 through flattening rollers 302 and 303.

Referring now to FIG. 9, an initial pre-form operation to welded steel coil ring 401 is pre-formed utilizing the combined rollers 404 and 405 mounted on rolling machine 402 with a base 403. This forms a profile at a ninety degree angle to welded steel coil ring 401 as shown in the included profile of FIG. 9.

Referring now to FIG. 10, a second pre-forming operation is performed to the first pre-formed steel coil ring 501, by a pre-forming roller 502 combined with an outer shaping roller assembly 503. This introduces two additional ninety degree bends or near ninety degree bends in first pre-form steel coil ring 501 as shown in the included profile of FIG. 10.

A third pre-forming operation can be included as shown in FIG. 11. Such third pre-forming operation is performed to a second pre-formed steel coil ring 601 by a combination of an internal roller assembly 602 and an external roller form 603. This third pre-forming operation depends on the ultimate desired profile of bearing seal 701.

Referring now to FIG. 12, a final pre-forming operation is performed wherein the final configuration of bearing seal 701 is formed utilizing a combination of tapered key 703 and segmented die 702. Such forming operation results in the formation of finished bearing seal 701 to its final configuration. It will be noted from the above steps that no waste material is formed from the initial width of steel coil 101 to the final configuration of bearing seal 701.

The material typically utilized for the formation of bearing seal or bearing seal case 701 is usually a steel of selected strength and forming capabilities, such steel is typically an ASTM steel number SAE 1010 of a thickness of 0.073" to 0.075" inch. All forming operations as part of the present invention are cold forming operations wherein it is not necessary to preheat the steel coil for any of the interim steps to perform the desired pre-forming operations.

What is claimed is:

1. A method of manufacturing a bearing seal comprising the steps of:
    feeding a steel coil of a preselected width into a ring rolling machine,
    cutting a divided length of the steel coil and
    rolling the length of steel coil into a closed coil ring having a butted joint,
    the butted joint of the closed coil ring is welded to form a welded steel coil ring,
    transferring the welded steel coil ring to a weld bead removal station, then
    transferring to a weld flattening machine
    wherein any weld bead at the butted joint between the two cut ends of the steel coil ring is flattened to form a flattened steel coil ring,
    transferring the flattened steel coil ring to a first pre-forming machine wherein a first profile is formed in the flattened steel coil ring to form a first profiled steel coil ring,
    transferring the first profiled steel coil ring to a second pre-forming machine wherein a second profile is formed in the first profiled steel coil ring to form a second profiled steel coil ring, transferring the second profiled steel coil ring to a third pre-forming machine wherein a third profile is formed in the second profiled steel coil ring to form a third profiled steel coil ring,
    and transferring the third profiled steel coil ring to a final forming machine wherein a final profile is formed in the third profiled steel coil ring to form a final profiled steel coil bearing seal, further comprising a step wherein the second profiled steel coil ring is transferred to a third pre-forming machine wherein a third profile is formed on the second profiled steel coil ring to form a third profiled steel coil ring prior to forming the first profile.

2. The method of claim 1
wherein the first profile formed in the flattened steel coil ring is formed at an angle of about 90°.

3. The method of claim 1
wherein the second profile formed in the first profiled steel coil ring is formed at an angle of about 90°.

4. The method of claim 1
wherein the final profiled steel coil bearing seal and the closed coil ring comprise eventually an identical amount of steel.

5. The method of claim 1
wherein the first profile forming the final profiled steel coil bearing seal results in a final profiled steel coil bearing seal ready to install as part of a complete bearing seal assembly.

6. A method of manufacturing a bearing seal comprising the steps of:
    feeding a steel coil of a preselected width into a ring rolling machine,
    cutting a desired length of the steel coil and rolling the length of steel coil into a closed coil ring having a butted joint, welding the butted joint to form a welded closed coil ring transferring the welded closed coil ring to a weld bead removal station, where excess weld bead is removed, transferring the welded closed coil ring to the weld bead. flattening station, where the weld bead is flattened;
    transferring the welded closed coil ring to a first pre-forming machine wherein a first profile is formed in the welded closed coil ring to form a first profiled steel coil ring,
    transferring the first profiled steel coil ring to a second pre-forming machines wherein a second profile is formed in the first profiled steel coil ring to form a second profiled steel coil ring, transferring the second profiled steel coil ring to a third pre-forming machine wherein a third profile is formed in the second profiled steel coil ring to form a third profiled steel coil ring,
    and transferring the third profiled steel coil ring to a final forming machine wherein a final profile is formed in the third profiled steel coil ring to form a final profiled steel coil bearing seal, further comprising a step wherein the second profiled steel coil ring is transferred to a third pre-forming machine wherein a third profile is formed on the second profiled steel coil ring to form a third profiled steel coil ring prior to forming the first profile.

7. The method of claim 6
wherein the first profile formed in the welded steel coil ring is formed at an angle of about 90°.

8. The method of claim 6
wherein the second profile formed in the first profiled steel coil ring is formed at an angle of about 90°.

9. The method of claim 6
wherein the final profiled steel coil bearing seal and the closed coil ring comprise eventually an identical amount of steel.

10. The method of claim 6
wherein the first profile forming the final profiled steel coil bearing seal results in a final profiled steel coil bearing seal ready to install as part of a complete bearing seal assembly.

11. The method of claim 6
wherein the welded steel coil ring is transferred to a weld flattening machine wherein any weld bead at the butted joint of the welded steel coil may be flattened.

* * * * *

UNITED STATES PATENT AND TRADEMARK OFFICE
CERTIFICATE OF CORRECTION

PATENT NO.       : 8,533,957 B2                                           Page 1 of 1
APPLICATION NO.  : 13/134646
DATED            : September 17, 2013
INVENTOR(S)      : Bryan J. Spurlock and Dwight A. Marcellus It is certified that error appears in the above-identified patent and that said Letters Patent is hereby corrected as shown below:

In the claims,

In Claim 1, Column 5, line 60, "first" should read "final".

Signed and Sealed this
Twenty-third Day of February, 2016

Michelle K. Lee
*Director of the United States Patent and Trademark Office*

UNITED STATES PATENT AND TRADEMARK OFFICE
CERTIFICATE OF CORRECTION

PATENT NO.       : 8,533,957 B2  
APPLICATION NO.  : 13/134646  
DATED            : September 17, 2013  
INVENTOR(S)      : Bryan J. Spurlock and Dwight A. Marcellus Page 1 of 1

It is certified that error appears in the above-identified patent and that said Letters Patent is hereby corrected as shown below:

In the claims, in Claim 6, Column 6, line 43, "first" should read "final"

Signed and Sealed this  
Seventh Day of June, 2016

Michelle K. Lee  
*Director of the United States Patent and Trademark Office*